United States Patent Office 3,133,065
Patented May 12, 1964

3,133,065
PURINE DERIVATIVES
John A. Carbon, Lake Bluff, Ill., assignor to Abbott Laboratories, North Chicago, Ill., a corporation of Illinois
No Drawing. Filed July 30, 1962, Ser. No. 213,162
9 Claims. (Cl. 260—252)

The present application is concerned with certain purine derivatives. More particularly, it is concerned with 9-(5-nitro-2-furyl)purines carrying in the 6-position simple monovalent substituents such as amino, alkylamino, dialkylamino, halo, mercapto, alkylmercapto or alkoxy, and the process of their manufacture.

The compounds of the present invention correspond to the formula

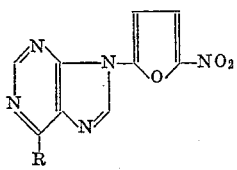

wherein the R-substituent in the 6-position has the above meaning. These new compounds are useful as antibacterial agents and fungicides.

There are two general processes leading to the manufacture of the aforesaid new purine derivatives: 6-chloropurine can be reacted first with 2-bromo-5-nitrofuran and the chlorine substituent may then be replaced by other monovalent radicals of the above-described group, or 6-chloropurine can be first reacted with a reactant which replaces the said chloro-substituent with the desired monovalent radical from the aforesaid group, and this simple purine derivative carrying the desired substituent in the 6-position is then reacted with 2-bromo-5-nitrofuran.

The present invention is better illustrated by reference to the following examples. It is to be kept in mind that these examples are only given to generally show the processes leading to the new compounds and are in no way intended to limit the invention.

EXAMPLE 1

6-Chloro-9-(5-Nitro-2-Furyl)Purine

To 35 ml. of bis(methoxyethyl)ether is added 0.67 gram of sodium hydride as a 56.5% suspension in mineral oil. The mixture is stirred at 20° during the addition of 3.88 grams of 6-chloropurine. After the reaction mixture is stirred for about 10–15 minutes, 5.38 grams of 2-bromo-5-nitrofuran is added. The resulting deep-red solution is stirred for 45 minutes at 70–80° C. whereupon the mixture is cooled and carefully poured into 60 ml. of ice-water. The brown solid formed is filtered and washed with water. Recrystallization of the precipitate from ethanol produces tan-colored crystals melting at 173–176° in a yield of 1.05 grams. An analytical sample shows a melting point of 176.5–177° C. and analyzes 40.68% C, 1.65% H, 13.38% Cl, and 26.50% N, corresponding with the calculated values for $C_9H_4ClN_5O_3$.

By replacing bis(methoxyethyl)ether used as the reaction medium above with dry dimethylformamide, substantially the same result is obtained.

EXAMPLE 2

6-Methylmercapto-9-(5-Nitro-2-Furyl)Purine

By replacing 6-chloropurine of Example 1 with 6-methylmercaptopurine, but with otherwise identical reaction conditions, 6-methylmercapto-9-(5-nitro-2-furyl) - purine is obtained in a yield of 36% as pale-yellow needles recrystallized from methoxyethanol. An analytical sample melts at 187–188° C. and analyzes 43.56% C, 2.60% H, and 25.36% N, corresponding with the calculated values for $C_{10}H_7N_5O_3S$.

EXAMPLE 3

6-Dimethylamino-9-(5-Nitro-2-Furyl)Purine (a) By replacing the 6-chloropurine of Example 1 with 6-dimethylaminopurine (described by Albert et al. in J. Chem. Soc., 1952, 4219), 6-dimethylamino-9-(5-nitro-2-furyl)purine is obtained in bright-yellow needles in a yield of 63.5%. An analytical sample recrystallized from methoxyethanol melts at 233–233.5° C. and analyzes 48.30% C, 3.63% H, 30.73% N, and 17.58% O, corresponding to the calculated values for $C_{11}H_{10}N_6O_3$.

(b) To 5 ml. of dry dimethylformamide, 90 mg. of sodium amide is added. After completing the reaction forming sodiodimethylamine, a solution of 500 mg. of 6-chloro-9-(5-nitro-2-furyl)purine in 5 ml. of dry dimethylformamide is added. The mixture is left standing at room temperature for 1 hour, whereupon a few drops of ethanol are added and the mixture is poured into ice-water. The mixture is then neutralized with acetic acid and the precipitate is isolated by filtration and washed with water. The crude product obtained in a yield of 60% melts at 228–230° C. Purification of this material by recrystallization from methoxyethanol produces bright-yellow needles melting at 233–233.5° C. which analyze 48.47% C, 3.31% H, 31.03% N, and 17.68% O. This compound has an infrared spectrum identical to that of the compound described under (a) above and shows no depression of the mixed melting point with that compound.

EXAMPLE 4

6-Mercapto-9-(5-Nitro-2-Furyl)Purine

A mixture of 400 mg. of 6-chloro-9-(5-nitro-2-furyl)purine, 400 mg. of thiourea, and 10 ml. of ethanol is refluxed for 1 hour. After cooling, the crude precipitate is filtered off and washed with water. The dry product obtained in a yield of 100% shows a melting point of 269–271° (dec.). Recrystallization of this material from dimethylformamide/water produces yellowish needles melting at 270–272° (dec.). Chemical analysis shows 40.84% C, 2.24% H, 26.54% N, and 12.76% S, corresponding to the calculated values for $C_9H_5N_5O_3S$.

EXAMPLE 5

6-Amino-9-(5-Nitro-2-Furyl)Purine

A mixture of 500 mg. of 6-chloro-9-(5-nitro-2-furyl) purine, 290 mg. of hexamethylene tetramine, 10 ml. of ethanol, and 2 drops of concentrated hydrochloric acid is heated to a boil. After refluxing for 3 hours, the mixture is filtered with suction and purified by vacuum sublimation at 220° C. to produce yellow leaflets melting above 300° C. An analytical sample shows 43.62% C, 3.04% H, and 34.21% N, corresponding to the calculated values for $C_9H_6N_6O_3$.

By replacing the above sublimation step by a recrystallization from dimethylformamide/water, substantially the same result is obtained.

EXAMPLE 6

6-Benzamido-9-(5-Nitro-2-Furyl)Purine

To a suspension of 0.79 gram of sodium hydride (as a 53.8% suspension in mineral oil) in 50 ml. of dry dimethylformamide is slowly added 7.17 grams of 6-benzamidopurine. After hydrogen evolution ceases, 6.33 grams of 2-bromo-5-nitrofuran is added under agitation. The dark mixture is heated at 100° C. for 30 minutes and then poured into ice-water. The dark-brown solid formed is filtered, washed with water, and subsequently with 150 ml. of boiling ethanol. The crude material obtained in a yield of 5.5 grams is purified by recrystallization from dimethylformamide/water to produce 41% of the theoretical amount of 6-benzamido-9-(5-nitro-2-furyl)purine melting at 294–295° C. (dec.). Analysis shows 55.13% C, 3.07% H, and 24.18% N, corresponding to the calculated values for $C_{16}H_{10}N_6O_4$.

EXAMPLE 7

6-Ethoxy-9-(5-Nitro-2-Furyl)Purine

By replacing the 6-methylmercaptopurine of Example 2 with 6-ethoxypurine and proceeding in the manner outlined in Example 2, 6-ethoxy-9-(5-nitro-2-furyl)purine is obtained in substantially the same yield as in the above example.

The 6-substituted 9-(5-nitro-2-furyl)purines of the present invention are useful anti-bacterial and fungicidal compounds; for instance, the compound wherein the 6-substituent is dimethylamino is active against *Staphylococcus aureus* in a dilution of 12 parts per million and against *E. coli* in a dilution of 25 p.p.m. The same compound is active against *Myrothecium verrucaria* in a dilution of 20 p.p.m. The 6-mercapto- and the 6-chlorocompounds are active against most commercial fungi in concentrations of between 20 and 80 p.p.m. Other 6-substitutions on 9-(5-nitro-2-furyl)purine which show substantially the same anti-bacterial and fungicidal activities include amino, alkylamino, dialkylamino, alkylmercapto, bromo, and acylamino of the configuration —NHCOR wherein R is alkyl (e.g., butyl), aryl (e.g., phenyl) or aralkyl (e.g., benzyl). In all the above groups the term "alkyl" is preferably a saturated carbon chain of 1 to 4 carbon atoms, although longer alkyl groups are equally acceptable.

The process of making the new purine derivatives is very simple and economical: it consists in treating a purine carrying in the 6-position the desired monovalent substituent from the above-mentioned class with sodium hydride or its equivalents in the presence of an inert polar organic solvent, and subsequently reacting the formed sodio-purine derivative, with or without isolation, with 2-bromo-5-nitrofuran at a temperature between 50° and 100° C. for a period between 20 and 120 minutes. The term "inert" is used above to express the inactivity of said solvent toward the formed intermediate purine derivative and toward the new 6-substituted 9-(5-nitro-2-furyl)purine. Among those solvents useful are dimethylformamide, dimethylacetamide, dimethylsulfoxide, bis(methoxyethyl)-ether, and similar alkoxy ethers.

Others may practice the invention in any of the numerous ways which will be suggested to one skilled in the art by the present disclosure. All such practice of the invention shall be considered a part thereof provided it falls within the scope of the appended claims.

I claim:
1. A purine of the formula

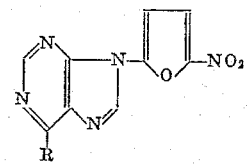

wherein R is selected from the group consisting of amino, loweralkylamino, di(loweralkyl)amino, chloro, bromo, mercapto, loweralkylmercapto, and loweralkoxy.
2. 6-chloro-9-(5-nitro-2-furyl)purine.
3. 6-methylmercapto-9-(5-nitro-2-furyl)purine.
4. 6-dimethylamino-9-(5-nitro-2-furyl)purine.
5. 6-mercapto-9-(5-nitro-2-furyl)purine.
6. 6-amino-9-(5-nitro-2-furyl)purine.
7. 6-benzamido-9-(5-nitro-2-furyl)purine.
8. 6-ethoxy-9-(5-nitro-2-furyl)purine.
9. The process of preparing a purine derivative of the formula

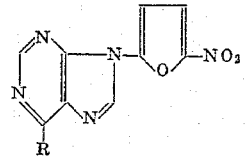

wherein R is selected from the group consisting of amino, loweralkylamino, di(loweralkyl)amino, chloro, bromo, mercapto, loweralkylmercapto, and loweralkoxy, consisting essentially of treating a purine of the formula

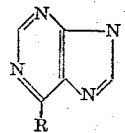

wherein R has the above meaning, with sodium hydride in a polar inert solvent, and
reacting the formed sodio-purine derivative with 2-bromo-5-nitrofuran at a temperature between 50° and 100° C. for a period between 20 minutes and 2 hours.

References Cited in the file of this patent

UNITED STATES PATENTS

| | | |
|---|---|---|
| 3,016,378 | Rock | Jan. 9, 1962 |
| 3,021,333 | Reisner et al. | Feb. 13, 1962 |
| 3,024,233 | Shermann | Mar. 6, 1962 |